(12) United States Patent
Boger

(10) Patent No.: US 7,509,632 B2
(45) Date of Patent: Mar. 24, 2009

(54) METHOD AND APPARATUS FOR ANALYZING CALL HISTORY DATA DERIVED FROM EXECUTION OF A COMPUTER PROGRAM

(75) Inventor: Lynn Anne Boger, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 11/089,470

(22) Filed: Mar. 24, 2005

(65) Prior Publication Data

US 2006/0218543 A1 Sep. 28, 2006

(51) Int. Cl.
*G06F 9/44* (2006.01)
(52) U.S. Cl. .................. 717/133; 717/127; 717/130
(58) Field of Classification Search ......... 717/124–128, 717/130–133
See application file for complete search history.

(56) References Cited

U.S. PATENT DOCUMENTS

| 6,513,155 | B1 | 1/2003 | Alexander et al. |
| 6,651,243 | B1 | 11/2003 | Berry et al. |
| 6,751,789 | B1 | 6/2004 | Berry et al. |

OTHER PUBLICATIONS

Whaley, J. 2000. A portable sampling-based profiler for Java virtual machines. In Proceedings of the ACM 2000 Conference on Java Grande (San Francisco, California, United States, Jun. 3-4, 2000). JAVA '00. ACM, New York, NY, 78-87. DOI=http://doi.acm.org/10.1145/337449.337483.*
Arnold et al. Approximating the calling context tree via sampling. Technical Report RC-21789, IBM Research, 2000.*
Jerding et al., Visualizing interactions in program executions May 1997, Proceeding s of the 19th International Conference on Software Engineering (ICSE'97), pp. 360-371.*

\* cited by examiner

*Primary Examiner*—Lewis A Bullock, Jr.
*Assistant Examiner*—Jason Mitchell
(74) *Attorney, Agent, or Firm*—Roy W. Truelson

(57) ABSTRACT

Call history data is sampled at fixed intervals during run-time, each sample representing only a limited portion of the stack. These data samples are subsequently automatically analyzed by merging overlapping sampled call history sequences to build larger call graphs, according to some pre-specified merge criterion. Preferably, the call history graphs are annotated with counts of the execution frequency (number of times a particular procedure was executing when the sample was collected) and the stack frequency (number of times the procedure appeared in the sampled stack portion) associated with each respective called procedure. Preferably, a graphical user interface presents the user with a graphical representation of the call graph(s) and annotations.

6 Claims, 11 Drawing Sheets

| Sample 1 301 | |
|---|---|
| Stack Level | Procedure |
| 10 | P10 |
| 9 | P9 |
| 8 | P8 |
| 7 | P7 |
| 6 | P6 |
| 5 | P5 |
| 4 | P4 |
| 3 | P3 |
| 2 | P2 |
| 1 | P1 |
| execution | P0 |

306 brackets stack levels 1–10; 305 points to execution row.

| Sample 2 302 | |
|---|---|
| Stack Level | Procedure |
| 10 | P12 |
| 9 | P11 |
| 8 | P10 |
| 7 | P9 |
| 6 | P8 |
| 5 | P7 |
| 4 | P17 |
| 3 | P16 |
| 2 | P15 |
| 1 | P14 |
| execution | P13 |

| Sample 3 303 | |
|---|---|
| Stack Level | Procedure |
| 10 | P9 |
| 9 | P8 |
| 8 | P7 |
| 7 | P6 |
| 6 | P5 |
| 5 | P4 |
| 4 | P3 |
| 3 | P21 |
| 2 | P20 |
| 1 | P19 |
| execution | P18 |

| Sample 4 304 | |
|---|---|
| Stack Level | Procedure |
| 10 | P6 |
| 9 | P5 |
| 8 | P4 |
| 7 | P3 |
| 6 | P2 |
| 5 | P1 |
| 4 | P0 |
| 3 | P25 |
| 2 | P24 |
| 1 | P23 |
| execution | P22 |

FIG. 3

METHOD AND APPARATUS FOR ANALYZING CALL HISTORY DATA DERIVED FROM EXECUTION OF A COMPUTER PROGRAM

FIELD OF THE INVENTION

The present invention relates to digital data processing, and in particular to methods and apparatus for generating data concerning the performance characteristics of computer programs.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software having enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed.

The evolution of computer software has led to the creation of sophisticated software development environments. These environments typically contain a range of tools for supporting the development of software in one or more high-level languages. For example, interactive source editors support the initial generation of source code by a developer. Source databases may support collections of source modules or source objects, which serve as the component parts of software applications. Front-end compiler/debuggers perform simple semantic verification of the source and reduction to a standard form. Back-end or optimizing compilers generate machine executable object code from the standard form, and may optimize the performance of this code using any of various optimization techniques. Build utilities assemble multiple object code modules into fully functioning computer programs.

Among the tools available in many such programming development environments are a range of diagnostic and debug tools. Although compilers and debuggers used during the initial creation and compilation phases of development can identify certain obvious inconsistencies in source code and produce object code conforming to the source, they can not verify the logic of a program itself, or that the program makes use of available resources in an efficient manner. This is generally accomplished by observing the behavior of the program at "run-time", i.e., when executed under real or simulated input conditions. Various tools exist which collect data concerning the run-time behavior of a computer program. Analytical tools assist the programmer in analyzing the run-time data to find logical errors, inefficiencies, or other problems with the code.

Many tools exist for collecting run-time data, but in general the data collected may be categorized as either trace data or sample data. Trace data is data which is collected in response to some specific program state. Typically, trace data is collected by "instrumenting" the programming code, meaning that special-purpose instructions are inserted in the code at key locations. These instructions may cause the collection of trace data whenever such an instruction is encountered during execution. The type and amount of trace data collected in response to encountering such an instruction may vary, and the collection of trace data may be conditional on other state variables in addition to the instruction. Sampled data, on the other hand, is typically data which is collected at pre-established sampling intervals during program execution, the sampling intervals being independent of program state. As in the case of trace data, the amount and type of data that is collected at a sampling interval may vary.

Data collected by run-time collection tools might include various program parameters, such as code paths taken, procedures and functions called, values of key variables, storage accesses, memory allocations, and so forth. One of the problems inherent in all data collection techniques, whether trace data or sample data is collected, is the overhead of collection, and in particular, the volume of data generated during program execution.

Trace data is useful in many circumstances, particularly for understanding a specific path which may be causing a problem. But trace data in particular has a tendency to impose a high overhead, which can in some circumstances distort the results. Where it is desirable to understand which portions of the code consume the most time during execution, the existence of frequently executed instrumentation points will by themselves cause a significant performance burden, and may distort results by making it appear as if a disproportionate share of time is spent executing code containing the instrumentation.

Sampled data is often useful for providing a statistical picture of the code routines in which the processor spends most of the execution time. Because sampled data is collected at fixed intervals which don't depend on program state, it is unlikely to significantly distort program performance. Moreover, because no instrumentation is required, sampled data can be easier to collect and consume less overhead.

Because sampled data is a "snapshot" collected independently of program state, it is sometimes difficult to understand a chain of events exhibited by the program. In particular, it can be difficult to understand the call history of a program from periodic "snapshots". For example, if the data collected with each sampling interval is the currently executing instruction or procedure, then one does not know how that procedure was called. Even if the calling procedure is also included in the sampled data, this may provide only limited information concerning the call history. This problem can be particularly acute when analyzing programming code written in any of various object-oriented programming languages, which have complex call histories and procedures ("methods") which are frequently called from different locations.

The overhead of sampling data depends on the amount of data collected with each sample. It would be possible to dump the entire contents of the stack every time a sample is collected in order to obtain a better understanding of call history, but this could potentially generate an enormous amount of data and impose significant program overhead. Moreover, because the stack size is variable, the overhead may be greater for some sampling intervals than others, which can distort the results.

As programs grow in size and complexity, and particularly as the use of object-oriented programming techniques grows, the task of analyzing and understanding run-time data, and in particular the task of analyzing and understanding call history from sample data taken during run-time, increases greatly in difficulty. A need exists for improved techniques for understanding program execution and call history data in a computer system.

SUMMARY OF THE INVENTION

Call history data is sampled during run-time by collecting data from recent stack entries at fixed sampling intervals. This data is subsequently automatically analyzed by merging overlapping sampled call history sequences to build larger call graphs, the sequences overlapping according to some pre-specified merge criterion.

In the preferred embodiment, each stack sample thus collected is limited to some fixed number of the most recent stack entries, and thus generally includes only a portion of the stack. In the case of some programs having short call sequences, or in the case of some samples from programs having longer call sequences, the stack may be sufficiently small that the sample contains the complete stack call history. Limiting the stack sample reduces the overhead of data collection. It may be possible to build a single complete call graph of the entire program (and this will be the case if the samples include the entire call history sequences), but in the typical case (because the sample size is limited) such analysis will produce multiple call graphs corresponding to respective portions of the program behavior during execution.

In the preferred embodiment, a call history graph constructed by merging samples is annotated with counts of the execution frequency and the stack frequency associated with each respective called procedure. Execution frequency represents the number of times a particular procedure was executing when a sample was taken, thus providing an indication of the procedures which consume the most execution resources. Stack frequency represents the number of times a particular procedure appeared on the stack portion which was collected in a sample that was merged into the call graph, thus providing an indication of the more frequently taken paths in the call graph.

In the preferred embodiment, a graphical user interface presents the user (program developer, system administrator, etc.) with a graphical representation of the call graph, annotated with execution and stack frequency. It may be possible to build a complete call graph of the entire program, although in the typical case such analysis will produce multiple call graphs corresponding to respective portions of the program behavior during execution. These multiple call graphs are preferably sorted for presentation to the user according to some measure of importance. In the preferred embodiment, this measure of importance is the largest stack frequency appearing anywhere in the call graph. Presentation to a user could alternatively be by other means, e.g. printed reports and the like.

The collection of limited size call history sequences by sampling at intervals is possible without undue performance burden, distortion of program behavior, or other overhead. Furthermore, by automatically merging limited size samples into larger call graphs, significant meaningful data concerning call paths frequently taken during actual program execution can be presented to the programmer. This information, obtained by automatic means without undue overhead, can significantly assist the programmer or other user in understanding program behavior, correcting program inefficiencies, tuning a computer system, and so forth.

The details of the present invention, both as to its structure and operation, can best be understood in reference to the accompanying drawings, in which like reference numerals refer to like parts, and in which:

BRIEF DESCRIPTION OF THE DRAWING

FIG. 3 is a conceptual representation of a collection of data sample sets taken at different respective intervals during execution of a monitored program, according to the preferred embodiment.

DETAILED DESCRIPTION OF THE PREFERRED EMBODIMENT

Development Environment Overview

The present invention relates computer program analysis using sampled data, and particularly to the analysis of frequently executed procedures and frequently taken code paths during execution of a computer program under simulated or actual conditions. Sampled run-time data is only one of a number of tools available to a developer to analyze and debug computer programs. In general, sampled execution data is used as part of a program development process, to identify errors in the flow of program execution, or to understand the effect of certain code procedures or instructions on the overall performance of the program. Such data might be used to provide feedback to a programmer, so that the programmer might correct defects or write code in a more efficient manner. It also might be used, in some circumstances, as input to an optimizing compiler, which would have the capability to employ alternative coding techniques (e.g. inlining) to avoid performance bottlenecks arising from certain frequently executed procedures. Typically, computer program development is an interactive process, in which code is written, compiled, tested and analyzed by any of various means (including analysis of sampled run-time data), corrected, re-compiled, and re-tested. However, the present invention is not necessarily limited to these particular uses, and execution data could conceivably be used for other purposes. For example, run-time data might be used to quantify or estimate system resource utilization, for purposes of determining whether additional resource (such as memory) is needed on the system. The user of a tool for generating and analyzing sampled run-time data is referred to herein as a "programmer" for ease of description, but this term is not meant to imply any restriction on the duties or classification of a person or persons using the invention claimed herein.

Detailed Description

Figure 1:
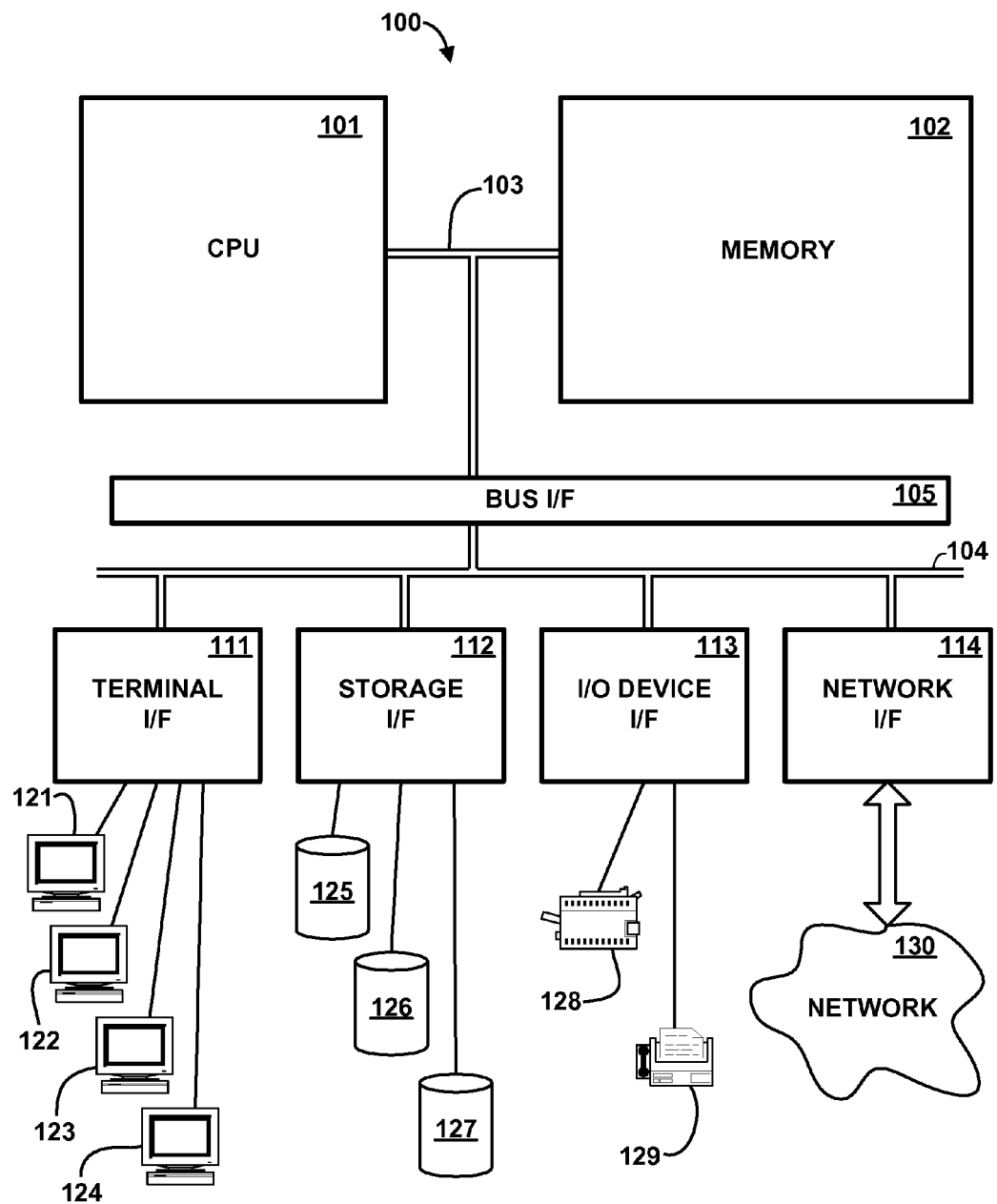
FIG. 1 is a high-level block diagram of the major hardware components of a computer system for collecting, analyzing and resolving call history data derived from execution of a computer program, according to the preferred embodiment of the present invention.

Referring to the Drawing, wherein like numbers denote like parts throughout the several views, FIG. 1 is a high-level representation of the major hardware components of a computer system 100 which collects, analyzes and resolves call history data derived from execution of a computer program, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 1011, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer system.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
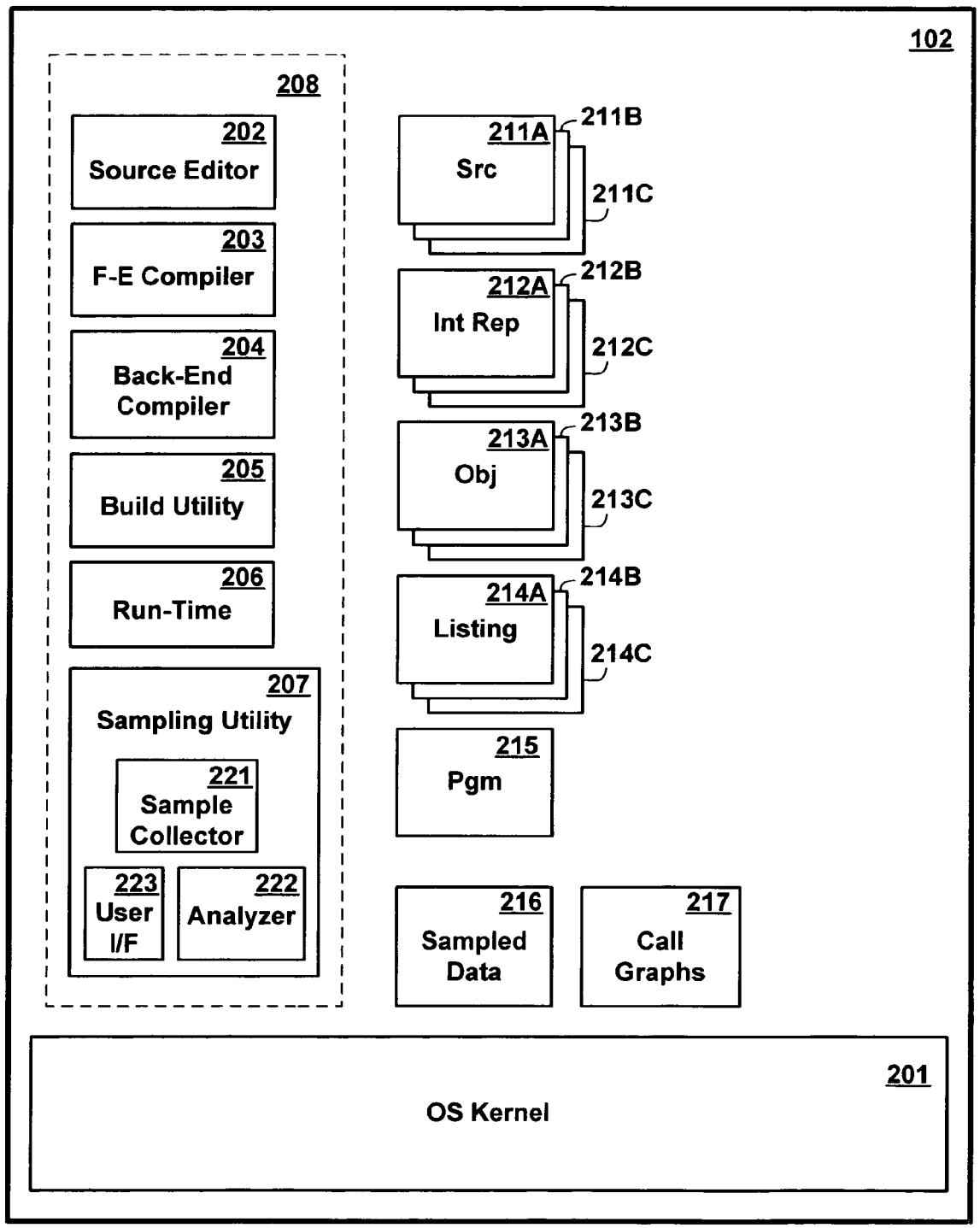
FIG. 2 is a conceptual illustration of the major software components of a computer system for analyzing call history data, according to the preferred embodiment.

FIG. 2 is a conceptual illustration of the major software components of system 100 in memory 102. Operating system kernel 201 provides various low-level software functions, such as device interfaces, management of memory pages, management and dispatching of multiple tasks, and so forth, as is well-known in the art. Various programs such as source editor 202, front-end compiler 203, back end (optimizing) compiler 204, build utility 205, run time utility 206, and sampling utility 207 form an integrated development environment 208 for producing executable computer programming code.

Source editor 202 is an executable computer program which supports the creation and editing of source code for other computer programs, using any of various known techniques. Source files 211A-211C (herein generically referred to as feature 211) are files containing source code which are created and edited using source editor 202. Source editor 202 may be a general-purpose free-form text editor for editing text files, which is non-specific to a programming language, or may a special-purpose source editor for one or more programming languages, and may contain an integrated source debugger for identifying and correcting certain errors.

Front-end compiler 203 is an executable program which converts source files 211A-C to corresponding files in an intermediate representation 212A-212C (herein generically referred to as feature 212). Intermediate representations may take any of various forms, but typically they provide some form of commonality between different source or object forms. I.e., source code written in different forms may be compiled by different front-end compilers to a common intermediate form for further compilation by a common back-end compiler. Alternatively, source code may be compiled by a single front-end compiler to a common intermediate form for use on different hardware platforms, the common intermediate form being then compiled by different back-end compilers associated with different respective hardware.

Back-end compiler 204 is an executable computer program which compiles the intermediate representation files 212A-C into corresponding object code modules 213A-213C (herein generically referred to as feature 213) of executable statements. Typically, back-end compiler has the capability to perform certain code optimizations, although it need not necessarily be an optimizing compiler. Optimization is often disabled during earlier stages of development, in order to obtain a closer correlation of source statements to compiled object code. If back-end compiler 204 has optimizing capabilities, it may have the capability to receive run-time sampled data generated by sampling utility 207 and use this data for optimizing the code it generates. Back-end compiler further has the capability to generate corresponding listing files 214A-214C (herein generically referred to as feature 214) as part of the compilation process. A listing 214 correlates instructions and variable locations in the executable object code with statements and variables in the intermediate representation 212 or source representation 202.

Build utility 205 is an executable computer program which builds a program 215 developed by development environment 208 by incorporating or binding multiple object code modules. Run-time support module 206 is low-level executable program code which provides necessary functions enabling a program built by build utility 205 to execute on system 100.

Sampling Utility 207 is an executable program which is used to assist the programmer in developing executable computer programming code by collecting, analyzing, and presenting run-time sampled data to the programmer. Sampling utility 207 may provide the programmer with various functions, as are known in the art. In particular, in accordance with the preferred embodiment, sampling utility 207 includes run-time sample collector 221, call graph analyzer 222, and user interface 223.

Run-time sample collector 221 is an executable run-time routine which is automatically collects sampled data 216 during execution of a monitored computer program which is preferably developed using development environment 208, such as program 215. Sample collector is resident in the background while a program is executing, and interrupts execution at periodic intervals to collect sampled data, i.e., selective program state data. The sampled data 216 collected by collector 221 thus comprises multiple sets of program state data, each set corresponding to a respective sampling interval at which the set was collected. Call graph analyzer 222 is an executable procedure which constructs one or more call graphs 217 from sampled data collected by collector 221. Generally, call graph analyzer is unable to construct a complete call graph showing the entire call history for execution of the monitored program, and constructs multiple call graph fragments (each of which is a call graph, but only a part of the larger complete call graph). However, in some circumstances it may be possible to construct a single, complete call graph. Preferably, call graphs are constructed after the monitored program has finished execution and all data samples are collected. The operation of call graph analyzer is described in greater detail herein. User interface 223 is a executable procedure which presents an interactive graphical user interface to the user (programmer) for sampling utility 207. In particular, user interface 223 preferably includes at least one function for displaying data obtained by sampling, including call graph fragments generated by call graph analyzer 222. User interface 223 may additionally include the capability to generate reports in a variety of different formats, to save report data in computer readable media, to print report data, etc.

Although source editor 202, front-end compiler 203, back-end compiler 204, build utility 205, run-time support module 206, and sampling utility 207 are shown as separate entities in FIG. 2, it will be understood that these are often packaged together as part of an integrated application development environment 208. Although sample collector 221, call graph analyzer 222 and user interface 223 are shown as executable routines or procedures within sampling utility 207, any or all of these might alternatively be separate routines or might be contained within some other program. Furthermore, it will be appreciated that some or all of these functions, and in particular run-time support, are often incorporated into an operating system. Additionally, although functional modules 202-207 are depicted in FIG. 2 on a single computer system 100 for completeness of the representation, it is not necessarily true that all functions will be present on a single computer system or will be performed on a single computer system. For example, editing of source code may be performed by source editors located in a distributed manner in individual workstations, while compiling, building and analysis of code might be performed by a centralized server.

Although a certain number of source modules, object modules, application programs and service programs are shown in the conceptual representation of FIG. 2, it will be understood that the actual number of such entities may vary, and in particular, that in a complex program development environment, the number of such entities is typically much larger. Furthermore, it will be understood that various entities could be stored in a distributed fashion on multiple computer systems.

While the software components of FIG. 2 are shown conceptually as residing in memory 102, it will be understood that in general the memory of a computer system will be too small to hold all programs and other data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 2 is not meant to imply any particular memory organizational model, and that system 100 might employ a single address space virtual memory, or might employ multiple virtual address spaces which overlap.

Figure 5:
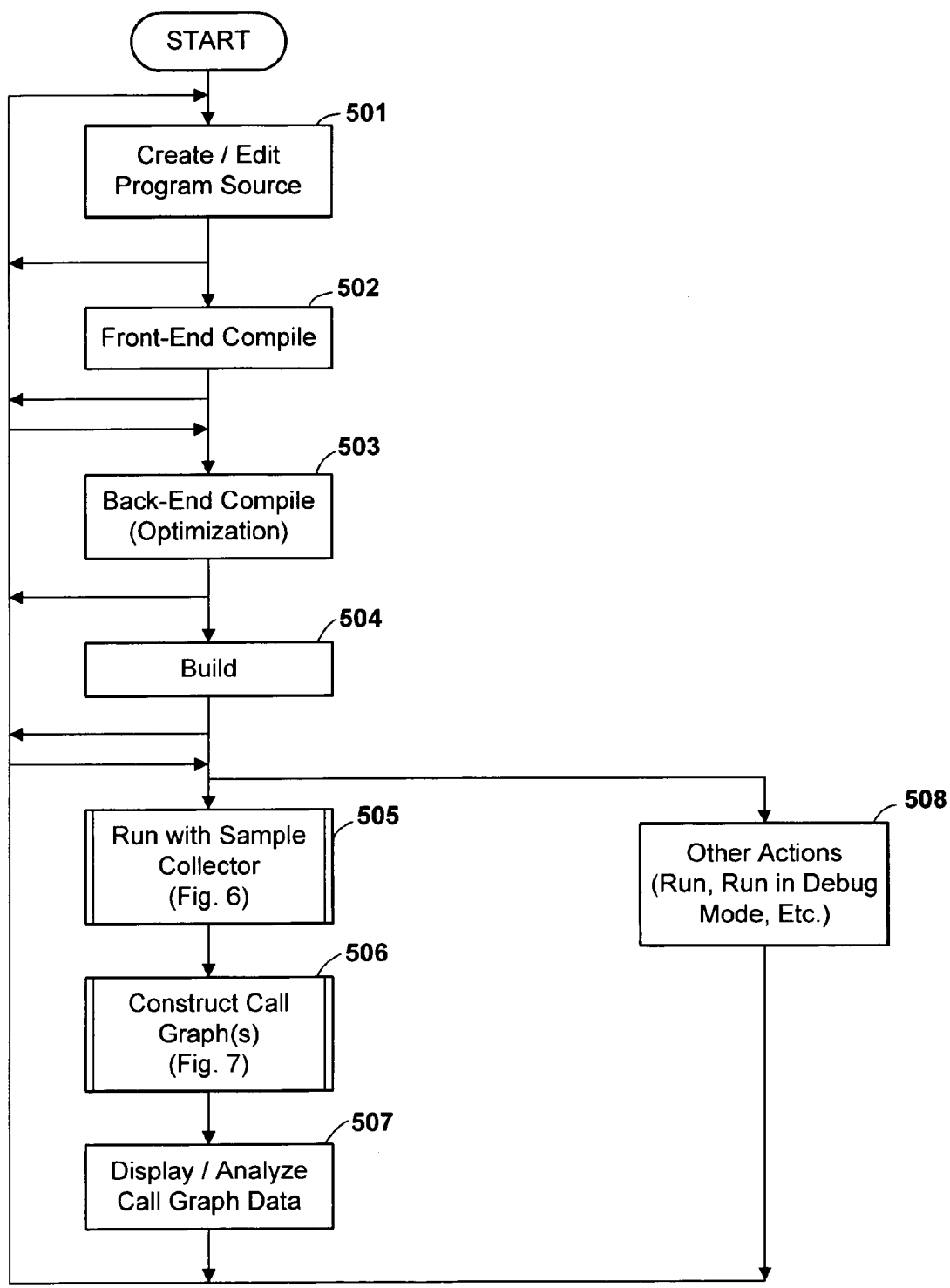
FIG. 5 is a high-level flow diagram showing the overall process of developing a computer program, according to the preferred embodiment.
Figure 6:
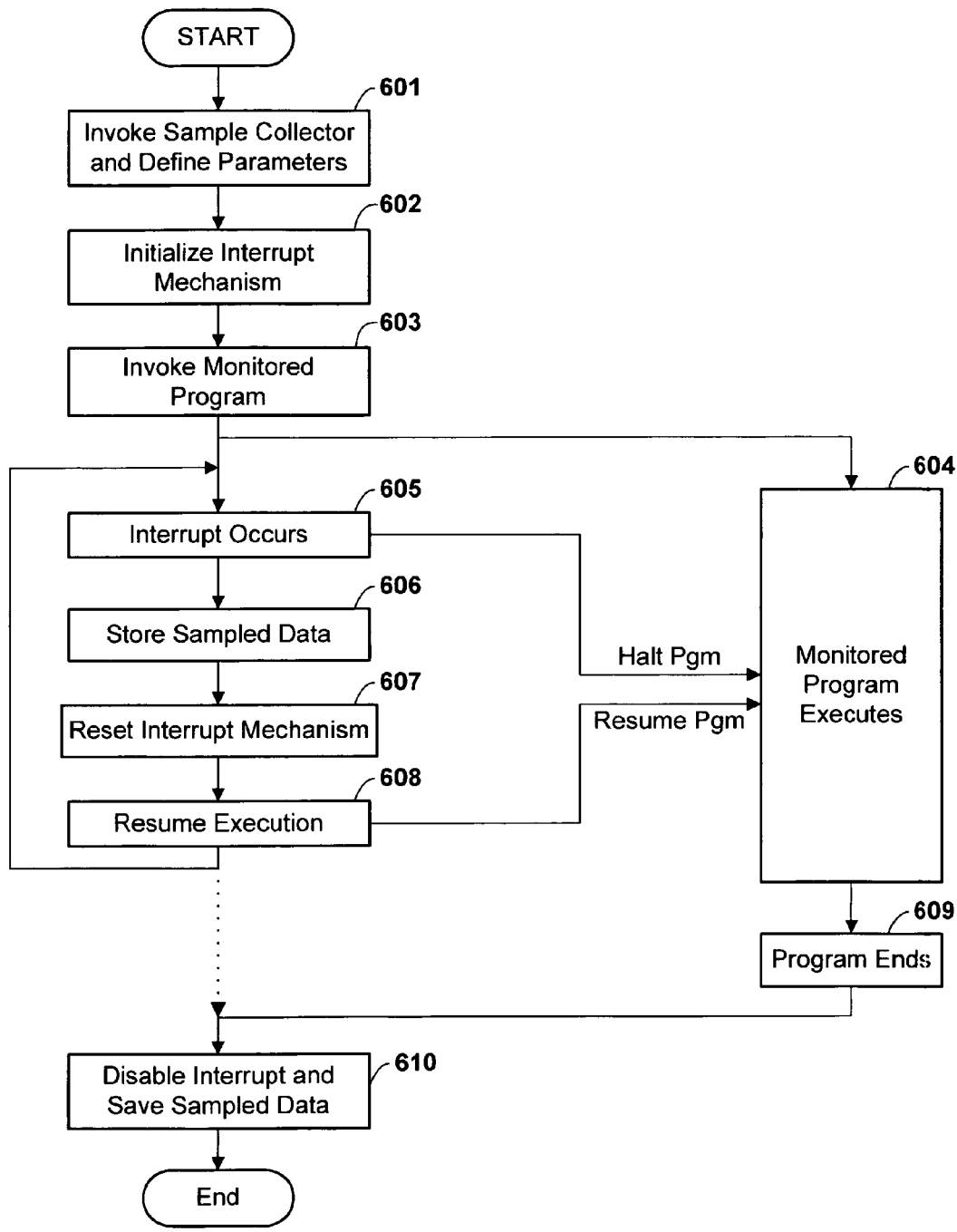
FIG. 6 is a high-level flow diagram showing in expanded form the process of collecting sampled data during execution of a monitored program, according to the preferred embodiment.

In accordance with the preferred embodiment of the present invention, a programmer analyzes certain performance characteristics of a computer program (the "monitored program") by executing the monitored program under simulated or actual conditions, while running the sample collector 221 in the background to collect sampled data at established intervals. The sampled data includes, in particular, snapshots of the currently executing procedure and portions of the call stack, at each of the established intervals. In order to reduce the volume of data collected by sampling, the sampled data includes only a limited portion of the most recent entries to the call stack. After program execution is complete, call graph analyzer 222 constructs one or more call graphs from the partial call stack samples. Because each sample contains only part of the call stack, samples are merged to form call graphs representing more data than is contained in any single sample. Preferably, samples are merged by identifying call history sequences in the samples which overlap according to some minimum overlap criterion. Call graphs thus constructed are extended as far as possible until further samples meeting the minimum overlap criterion can no longer be found. The call graphs thus constructed can be presented to the user in any of various ways, which preferably include a graphical display of the call graph relationship. These operations are represented in FIGS. 5-7 and described in greater detail below, with respect to an illustrative collection of data samples shown in FIG. 3 and consequent call graph shown in FIG. 4.

Referring to FIG. 3, a conceptual representation of a four data sample sets 301-304 taken at four different respective intervals during execution of a monitored program is shown. Each set comprises a currently executing procedure 305 and the N most recently appended procedures from the call stack 306. In the preferred embodiment, the data sample set includes only an identification of the procedure in the form of a procedure address, or as any other data which would uniquely identify the procedure, and does not include other state data (such as the state of local variables) from the stack. In the case of the currently executing procedure 305, the data sample preferably contains the current execution address from the instruction address register, although it could alternatively contain the address of the procedure's entry point. The number (N) of call stack entries contained in the sample set is preferably approximately 16 (although 10 are shown for illustrative purposes in FIG. 3), but this number could vary, and could be specified by the user prior to data collection. Each sample contains only the N most recently appended call stack entries, regardless of the number of entries on the call stack at the time the sample was taken, unless fewer than N entries were on the call stack, in which case the sample will contain all the entries on the call stack. A sample set could include other state data (not shown), but in general it is desirable to hold the amount of such state data to a bare minimum in order to reduce the volume of data collected and the overhead of collecting sampled data, which could distort the program's performance.

Figure 4:
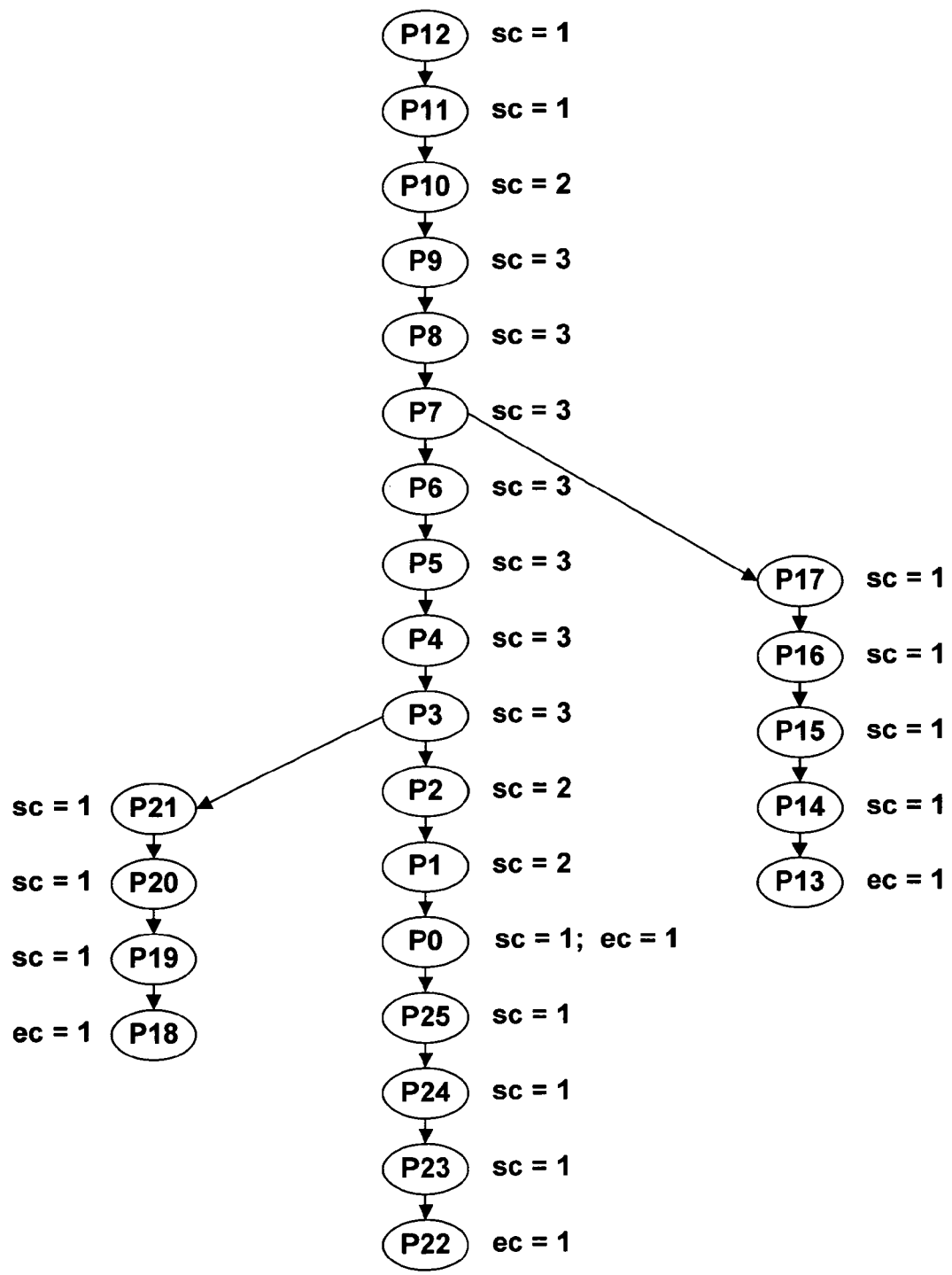
FIG. 4 is a conceptual illustration showing a structure of an illustrative call graph constructed from the sampled data sets of FIG. 3, according to the preferred embodiment.

FIG. 4 is a conceptual illustration showing a structure of an illustrative call graph constructed from the sampled data sets of FIG. 3, according to the preferred embodiment. A call graph is a directed graph showing a sequence in which procedures were called during execution of the monitored program, each node in the call graph representing a respective procedure with a unique call history. A call graph has a single root node, which in the exemplary call graph of FIG. 4 is the node representing procedure "P12". A call graph may have multiple branches, as shown in FIG. 4. Each node in the call graph is annotate with a stack count ("sc" and an execution count ("ec"). The stack count represents the number of times the procedure corresponding to the node appeared on the N most recently appended procedures from the call stack 306 in a set of sampled data. The execution count represents the number of times the corresponding procedure was the executing procedure 305 in a sample set. The execution count is significant in that, if there are a sufficiently large number of samples, it provides a statistical measure of the proportion of time spent executing the corresponding procedure. The stack counts are helpful in representing the relative frequency that particular call paths (sequences of calls) are taken during execution. Both of these are potentially useful in analyzing a computer program. For example, although knowledge of the procedures which consume the most execution resources is obviously significant, it may be difficult to apply this knowledge in the case of certain utility procedures which are called from many different code locations, if it is not known which locations are generating the bulk of the calls.

It should be understood that FIGS. 3 and 4 are conceptual illustrations for purposes of explaining the collection and analysis of sampled call history data, and that the actual structures of sample data sets, and particularly the actual structure of a call graph, may be more complex. In particular, call graph entries will typically contain at least some additional data, such as forward and backward pointers, pointers to a parent or root node, status bits, and so forth, useful in constructing or traversing a graph. Additionally, data represented in FIGS. 3 and 4 may be physically distributed across multiple data structures, with node entries containing appropriate references (such as pointers) to the additional data. Finally, it should be understood that the volume of data represented in FIGS. 3 and 4 is greatly simplified for illustrative purposes, and is normally much larger. In a typical instance of collecting data in a monitored program, 100,000 samples may be collected, although this number may vary considerably depending on the collection parameters.

FIG. 5 is a high-level flow diagram showing the overall process of developing a computer program 215 using integrated development environment 208, according to the preferred embodiment. In particular, one of the stages of development involves collecting and analyzing sampled data, as described herein. Collection and analysis of sampled data is typically performed iteratively on different version of program 215, which is repeatedly modified and re-analyzed (using sampled data or otherwise) until a desired result is achieved.

Referring to FIG. 5, a programmer creates and/or edits one or more source files 211 using source editor 202 (step 501). Source editing may be accomplished using any conventional technique, and is typically performed using an interactive on-screen editor. Portions of a source file or modules may be imported from source libraries or other applications, as is particularly common in the case of so-called object-oriented programming environments. When finished editing, the edited source file 211 is saved in storage for later compiling and further editing.

The programmer may then continue to edit the source file (as shown by the flow path returning to step 501), or may proceed to compile the source. Preferably, the source file 211 is processed by front-end compiler 203 to produce an intermediate code representation 212 (step 502), which is also saved in storage. Where the front-end compilation is unsuccessful, i.e. one or more errors were detected in the source file, the programmer will return to further edit the source (shown by the flow path returning to step 501). Following successful completion of the front-end compile, the programmer may return to step 501 to perform further editing operations, or may continue to back-end compilation (step 503). Back-end compilation produces object code 213 and compilation listing 214. Back-end compilation is performed in accordance with any conventional compilation techniques, which may or may not include any of various code optimizations. Although in the preferred embodiment, compilation is a two-stage process producing an intermediate code version, it will be understood that in some development environments, compilation is an indivisible process and no intermediate representation is produced.

Following the back-end compilation, the programmer may again return to step 501 to perform further editing operations, or may continue to build a program 215 from multiple object modules 213 using build utility 205 (step 504). After the build process, the programmer may again return to step 501 to edit the source, or may perform another build (e.g., because one of the other included object modules has changed), or may execute the program in any of various modes in order to test or analyze its operation. Execution is represented by two downward paths diverging from step 504, one path proceeding through steps 505-507 and representing execution for purposes of collecting and analyzing sample data, as explained further herein, and the other path proceeding through step 508 and representing any of various alternative modes of execution. For example, step 508 might represent execution in a debug mode wherein program execution can be halted in the middle of the program by occurrence of various events, or might represent execution normally by running a series of test cases and verifying the results observed, or some other mode. Any of these processes may be repeated indefinitely (as indicated), or may cause the programmer to return to step 501 to again edit the source, or, in the case of certain compilers which use profiling data collected during execution as part of the optimization process, to return to step 503 to re-compile the code.

Where the programmer elects to collect and analyze sampled execution data, the programmer first executes the program using the sample collector to collect sampled data (step 505). The process of executing the program to collect sampled data is shown in greater detail in the flow diagram of FIG. 6. The sampled data thus collected is analyzed to construct one or more call graphs representing the call history of the program (step 506). The process of constructing call graphs from sampled data is shown in greater detail in the flow diagram of FIG. 7. The results generated are then available for analysis by the programmer, and in particular may be displayed on an interactive display screen, including a graphical representation of the call graph (step 507). FIGS. 8A and 8B represent example displays of call graph data.

Generally, the main purpose of collecting and analyzing sampled execution data is to identify procedures or sets of procedures which consume the most execution resource time, and to use that information to do more detailed analysis to improve the performance of the program being analyzed. For example, using such data a programmer might: review the design to determine whether the actual implementation matches the design expectations; review the design to determine whether any of the algorithms used by the high use procedures could be improved; inspect the code within the high use procedures to determine whether there are code improvements to be made (which could include use of a lower level language); identify which portions of the program should be analyzed in more extensive detail, such as with detailed profiling tools, to collect information at the instruction level to identify code paths taken or calls made. However, these are merely examples of the uses to which such data may be put, and are not intended as a limitation on the use of such data or an exhaustive list of its use.

FIG. 6 is a high-level flow diagram showing in expanded form the process of collecting sampled data during execution of a monitored program (represented in FIG. 5 as step 505), according to the preferred embodiment. Referring to FIG. 6, sample collector 221 is invoked and the collection parameters are defined, either explicitly (e.g., by interactively specifying the parameters) or implicitly (e.g., by assuming default parameters (step 601). The collection parameters include, e.g., the intervals or events at which sampled data is to be collected, the type of data collected, name of a file containing collected data, and so forth. The sample collector then initializes data collection, and in particular, initializes the interrupt mechanism (step 602). The sample collector then invokes the monitored program to begin execution thereof (step 603).

Preferably, computer system 101 includes hardware interrupt mechanisms for interrupting a currently executing program upon the occurrence of some pre-defined events. At least one such interrupt can be used by collector to interrupt an executing program for the purpose of collecting sampled data. Once the interrupt mechanism is appropriately initialized (at step 602), the hardware interrupt will operate independently of the execution state of the monitored program. This is represented in FIG. 6 by the divergent paths following step 603. As represented by step 604, the monitored program executes normally, using simulated or actual data. Concurrently, the interrupt mechanism waits for the interrupt condition to occur. Interrupts preferably occur at regular intervals, which could be measured or generated in any of various ways. For example, the interrupt could be triggered by the time-out of a timer, or could be triggered by a counter which counts instructions or processor cycles, or some similar means. When an interrupt occurs (step 605), the program is temporarily halted. A data collection process is then invoked, which stores the data to be collected at the sampling interval in sampled data file 216 (step 606). In the preferred embodiment, this sampled data is a current instruction address of the monitored program and the N most recent stack addresses. In the preferred embodiment, N is 15, so that 16 addresses (15 from the stack, and an additional one from the current instruction address) are saved with each sample, but this number could vary. The sample collector then resets the interrupt mechanism so that it will trigger the next interrupt at the appropriate interval (step 607), and causes the monitored program to resume execution (step 608). Steps 605-608 will be performed many times during execution of the monitored program.

At some time, execution of the monitored program ends (step 609). At this point, control returns to the sample collector, which disables the interrupt mechanism to end the collection of sampled data and saves the data in storage (step 610).

Figure 7A:
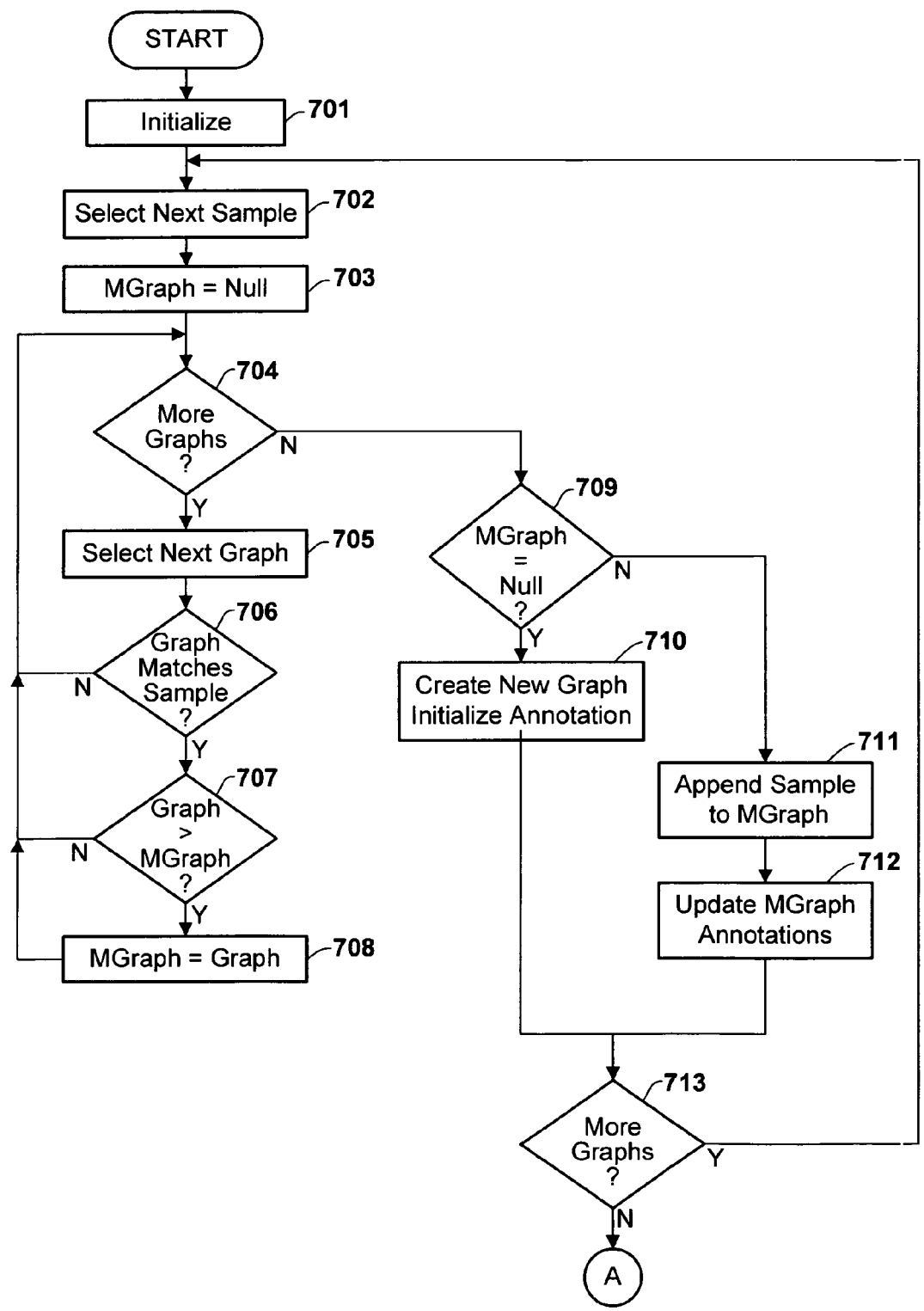
FIGS. 7A, 7B and 7C (herein referred to collectively as FIG. 7) are a flow diagram showing in expanded for the process of constructing call graphs by merging call sequences from sampled data, according to the preferred embodiment.
Figure 7B:
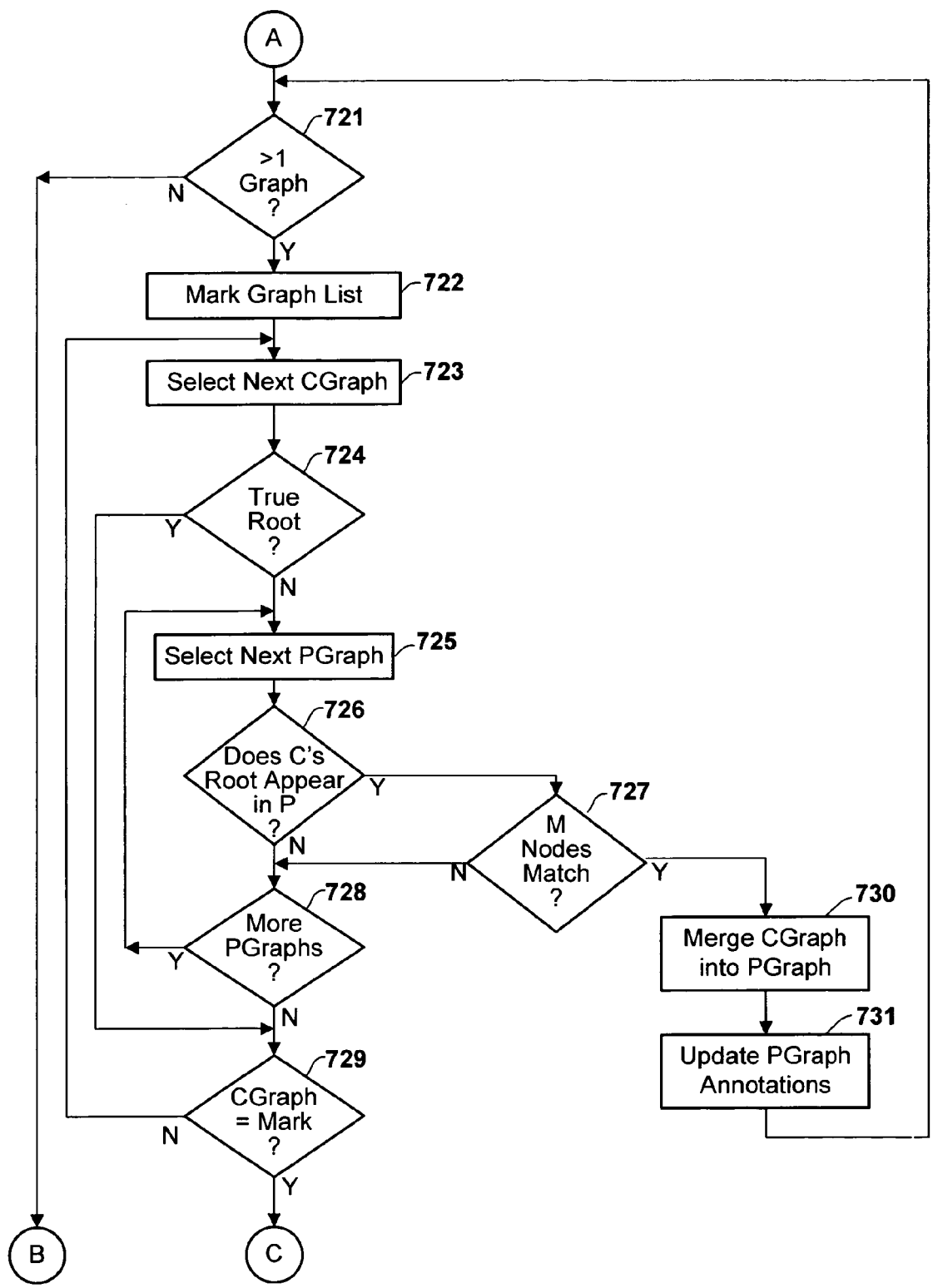
Figure 7C:
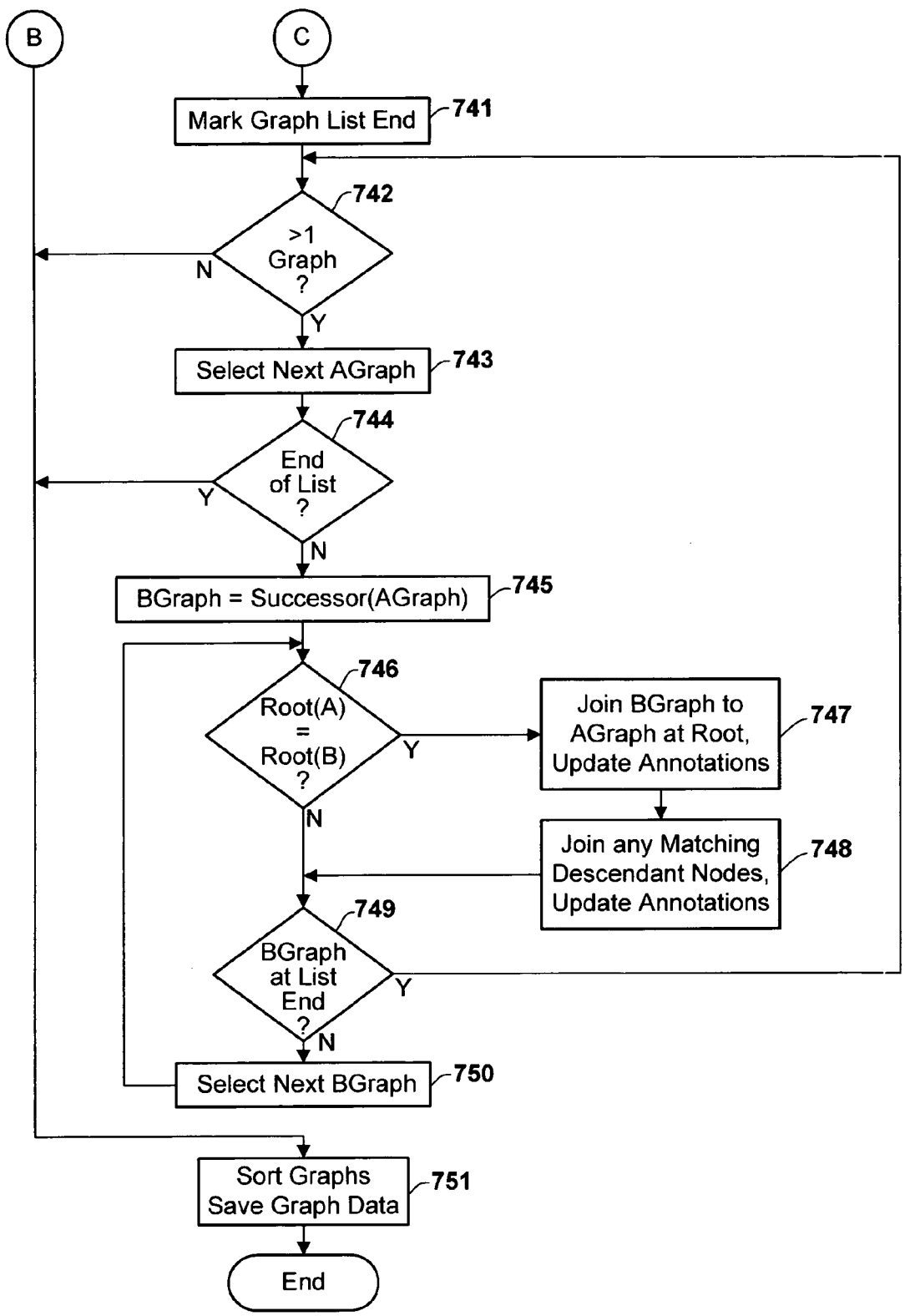
Figure 8A:
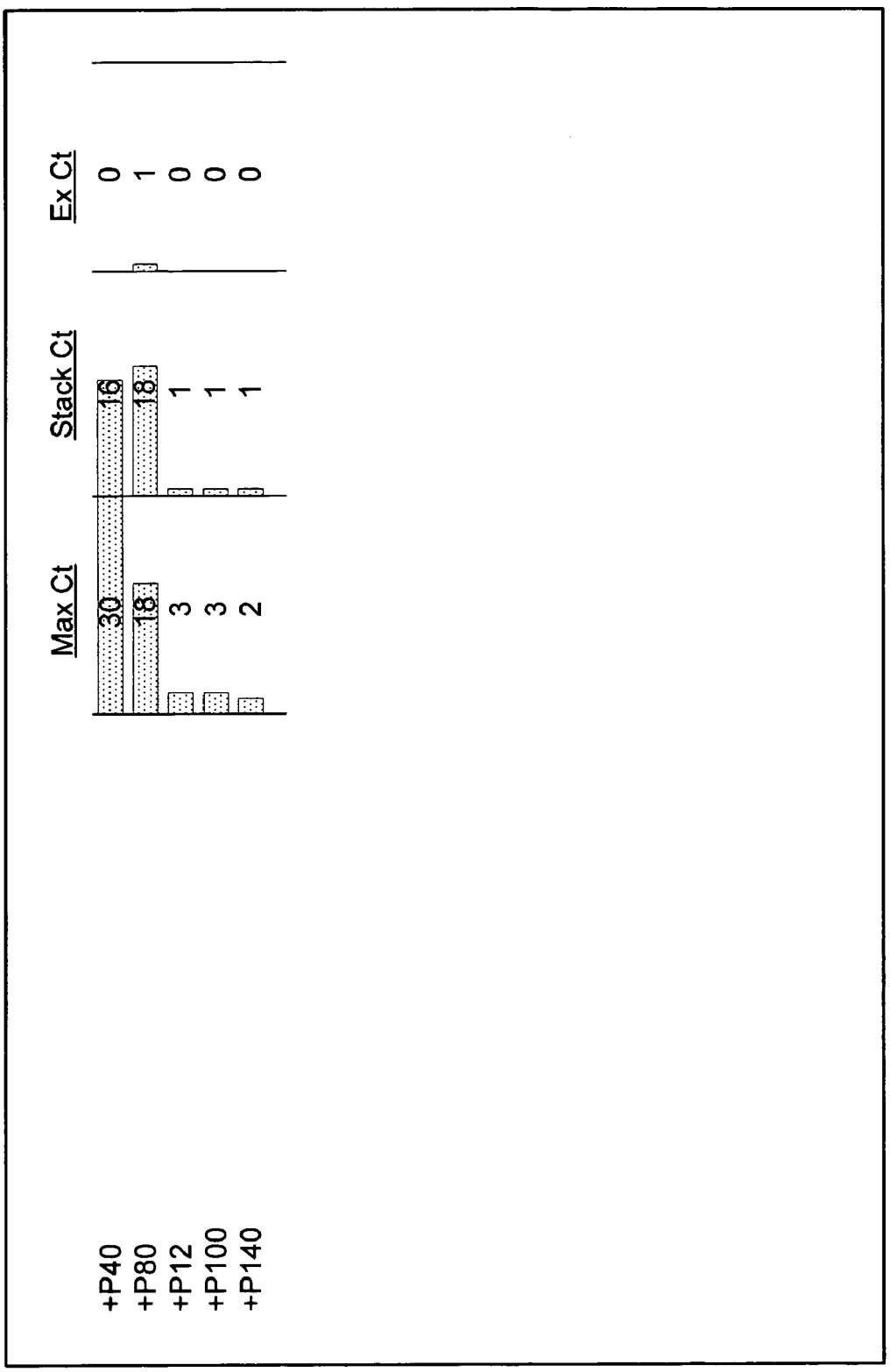
FIGS. 8A and 8B are simplified representations of an interactive display showing call graph data including the call graph of FIG. 4, according to the preferred embodiment.
Figure 8B:
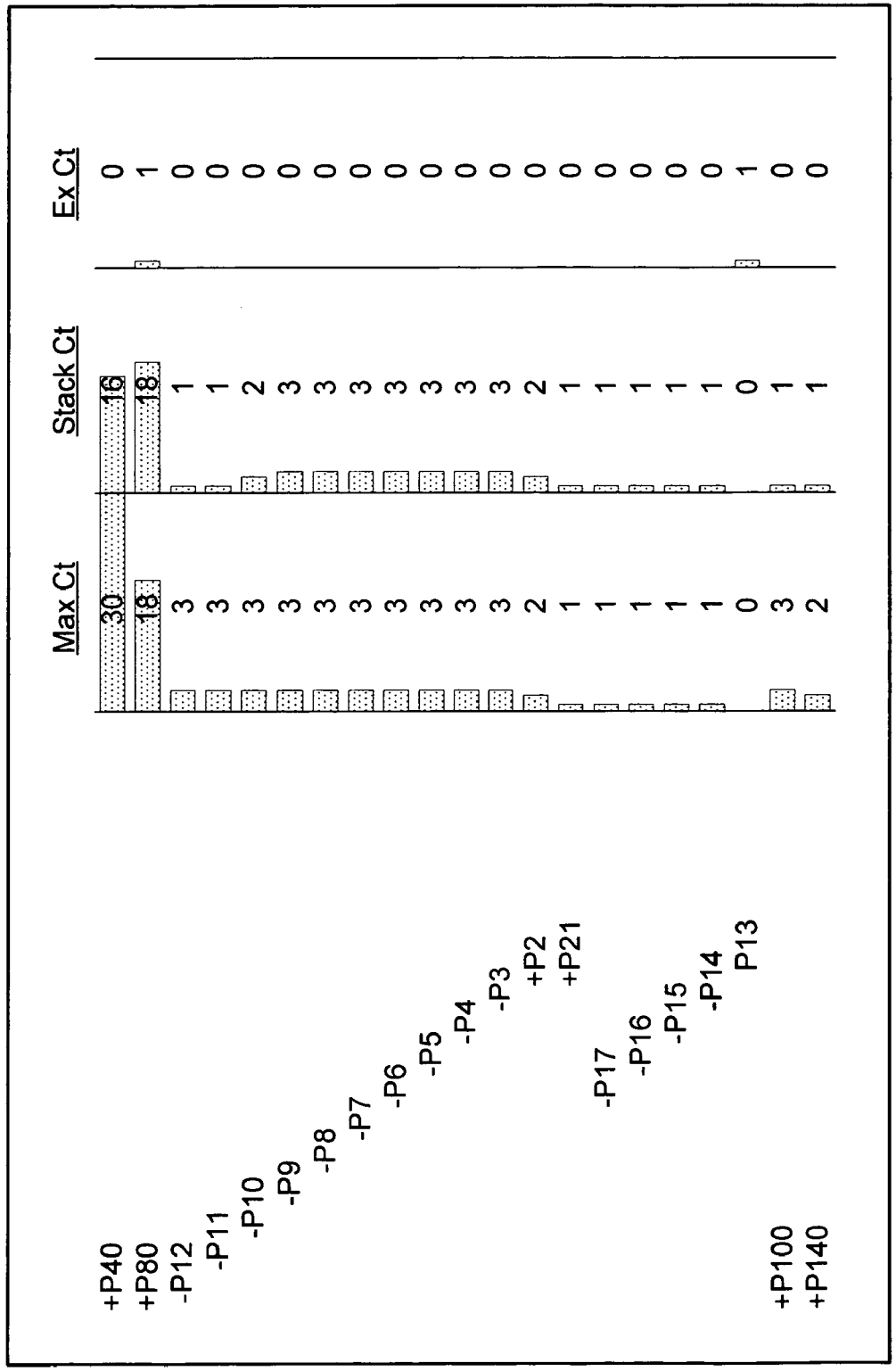

FIGS. 7A, 7B and 7C (herein referred to collectively as FIG. 7) are a flow diagram showing in expanded for the process of constructing call graphs by merging call sequences from sampled data, according to the preferred embodiment. Referring to FIG. 7, after execution is completed and sampled data sets are collected, analyzer 222 is invoked and initializes its data structures (step 701). Analyzer then selects a next sampled data set from a list of sampled data sets collected previously (step 702). The temporary variable MGraph, which is used to identify the call graph, if any, which best matches the call sequence in the selected sample, is initialized to a null value (step 703).

The analyzer then traverses the entire list of call graphs which has been constructed from sampled data sets up to this point (steps 704-708). I.e., at step 704, if more unvisited call graphs remain on the list, the 'Y' branch is taken, and a next call graph is selected (step 705).

The analyzer then determines whether the call graph selected at step 705 "matches" the call history sequence in the sample data set which was selected at step 702, according to some pre-determined merge criterion or criteria, this determination being indicated by step 706. The criteria used to determine whether a match is sufficient could vary. In general, it is desirable to observe a partial sequence of calls which is identical in both the sampled data set and the selected call graph. Referring to FIG. 4, the call graph is in general a tree structure, having a single root node, but potentially multiple branches. A call sequence from a sampled data set is simply a linear sequence; it has a root, but no branches (this being a result of the fact that it is taken from the stack, and therefore represents a single path that was taken to reach the currently executing procedure). By matching some part of the call graph with some part of the call sequence from the sample, it may be assumed that the call sequence from the sample represents a missing piece of a more complete call graph, which can be constructed by merging the call sequence from the sample with the call graph.

The merge criteria are necessarily heuristics. It is desirable to construct a call graph representing the actual call history during execution, but because information is incomplete, it is generally impossible to know the call history for certain. The more demanding the merge criteria, the fewer samples will be able to meet the criteria, and these samples will be left as isolated call graphs. The looser the criteria, the more samples will be merged, but there is also a greater probability that samples will be merged incorrectly. I.e, the mere fact that one or more procedures appear in call sequences from different sampled data sets does not mean that during actual execution these procedures were part of the same call sequence, since a procedure (or string of procedures) can be called from multiple sources.

It is noted preliminarily that a fixed number of (N+1) stack entries is collected at step 606, and this fact can be used to advantage. If a sample contains fewer than N+1 entries, then it is known that the stack had fewer than N entries when the sample was collected, and that the sample therefore contains all the called addresses on the stack at the time of sampling. This necessarily means that the oldest address in the sample is a "true root", which is not called from any other procedure. Such a "true root" is marked in any call graph constructed from such a sample, and will not be joined as a child to some other node as a parent.

In the preferred embodiment, the merge criteria are met if at least one of the following three conditions is met:
(a) a sub-sequence of at least M nodes in the selected call graph, starting from the root node and going down, matches a sub-sequence of at least M procedures in the call history sequence from the sampled data set, starting from its root or top (i.e., the earliest called procedure) and going down; or
(b) if the root node of the selected call graph is not a "true root", a sub-sequence of at least M nodes in the selected call graph, starting from the root node and going down, matches a sub-sequence of at least M procedures within the call history sequence from the sampled data set (the matching sub-sequence within the call history sequence may be anywhere, at the beginning, end, or in the middle, of the call history sequence from the sampled data set); or
(c) if the root procedure within the call history sequence from the sampled data set is not a "true root", a sub-sequence of at least M procedures, starting from the root procedure, within the call history sequence from the sampled data set matches any sub-sequence of at least M nodes in the selected call graph (the matching sub-sequence within the selected call graph may be anywhere in the call graph).

In the preferred embodiment M is 4, but this number could vary, and could be user-selectable.

If the selected graph does not meet the "match" (does not meet the merge criteria), the 'N' branch is taken from step 706, and the analyzer returns to step 704. If there is a match, the 'Y' branch from step 706 is taken, and the match fit is compared to that of MGraph (step 707). MGraph represents the best fit match found so far. "Fit" in the preferred embodiment is determined by the number of matching nodes, although other criteria could be used. If the number of nodes in the currently selected graph which match a corresponding sub-sequence from the selected sample, according to the match criteria above, exceeds the number of such nodes in MGraph which match a corresponding sub-sequence, then the currently selected graph is deemed a better "fit", and the currently selected graph replaces MGraph (step 708). In either case, the analyzer then returns to step 704.

When all call graphs have thus been compared to the currently selected sample data set, the 'N' branch is taken from step 704. If the value of MGraph is still null, then the analyzer was unable to find any graph into which the sampled data could be merged. In this case, the 'Y' branch is taken from step 709, and a new call graph is generated from the sampled data set (step 710). This new call graph is simply a linear sequence having no branches, the annotations in each node being initialized to a stack count of 1 (except the final node, which is initialized to an execution count of 1).

If at least one graph was found which met the merge criteria, the MGraph will be a non-null value, and the 'N' branch is taken from step 709. In this case, the sampled data set sequence is appended to the call graph identified by MGraph (step 711). This may mean that a sequence of one or more nodes is appended above the existing root node of MGraph (in the case of merge criterion (a)), creating a new root node, or that a new branch is formed or an existing branch extended, or both of these things could occur by appending a single sample. The annotations for MGraph are then updated appropriately by incrementing the appropriate count of any existing node of MGraph which matches a procedure in the sample sequence, or by appropriately initializing the counters of any newly appended nodes (step 712).

If any more samples remain to be analyzed, the analyzer takes the 'Y' branch from step 713 and returns to step 702 to select the next sample. When all samples have been thus analyzed, the 'N' branch is taken from step 713.

At this point, all sampled sequences have been converted into call graphs and (typically) many have been merged to form larger call graphs. However, it may be possible to further merge the existing call graphs, using essentially the same merge criteria. Therefore, another "pass" is made at the data, represented generally be steps 721-731. In this "pass", the list of call graphs is traversed, compared, and merged (where possible) until the entire list can be traversed without finding another merge, or until only 1 graph remains.

As shown in FIG. 7B, if there is only one call graph left, the 'N' branch is taken from step 721 and the analyzer moves on to the next phase. If there are more than one call graphs, the 'Y' branch is taken from step 721. At step 722, the analyzer marks the current location in the list of call graphs (which can be regarded as a circular list). This mark is reset every time a merger is performed, and if it is ever reached again while traversing the list, then it means that the entire list of call graphs has been traversed without finding a merger.

The analyzer then select a next child graph (CGraph) at step 723, which it will attempt to merge into a parent graph by traversing all the existing call graphs. If the root node of the selected CGraph is a "true root", then it is not possible to merge CGraph as a child into a parent graph, and the 'Y' branch is taken from step 724 to step 729. If CGraph does not contain a "true root", the analyzer proceeds to select a next parent graph (PGraph) at step 725.

The analyzer then examines PGraph to determine whether the root node of CGraph appears anywhere in PGraph (step 726). If not, it is not possible to append CGraph (as a child) to PGraph (as a parent), and the 'N' branch is taken from step 726. If CGraph's root appears in PGraph, then the analyzer compares each sequence of (M−1) children of CGraph's root with each sequence of (M−1) children from the matching node of PGraph (step 727). If there is no matching sequence, then CGraph (as a child) can not be appended to PGraph (as a parent), and the 'N' branch is taken from step 727. If the 'N' branch is taken from either step 726 or 727, the analyzer determines whether any more graphs remain to be selected as PGraph (step 728). If so, the 'Y' branch is taken to step 725, and the next graph is selected as PGraph. When the entire list of graphs has been traversed and selected as a PGraph from comparison to the currently selected CGraph, the 'N' branch is taken from step 728. In this case, the analyzer determines whether the current CGraph is the "marked" graph (i.e., the last CGraph). If not, the 'N' branch is taken from step 729, and a next CGraph is selected at step 723. When the entire list of graphs has been traversed and CGraphs selected, the 'Y' branch is taken from step 729 and the analyzer proceeds to the next phase.

If, at step 727, a sufficiently long matching sequence of nodes was found, the 'Y' branch is taken, and the currently selected CGraph is merged as a child into the currently selected PGraph as a parent (step 730). The graph annotations in PGraph are then updated by adding the stack counts and execution counts of each node of CGraph to the corresponding counts of each respective corresponding node of PGraph. (step 731). The analyzer then returns to step 721.

After merging call graphs as described with respect to steps 721-731, the analyzer performs one last "pass" over the data to merge any call graphs which have a common root node, whether or not any children below the root match. This final pass consolidates some of the call graphs which could not otherwise be merged, particularly at the highest levels. For example, it will be observed that if a root procedure of a program makes multiple calls to multiple different child procedures, it will never be possible to merge these using the previously specified merge criteria, because any single call sequence will have only the root node in common with a call sequence through a different child procedure.

As shown in FIG. 7C, the analyzer marks an arbitrary location in the graph list, it being necessary to traverse the list only once in the final pass (step 741). If only one graph remains, the 'N' branch is taken from step 742, and the final "pass" is finished. If the 'Y' branch is taken from step 742, the analyzer selects a next graph (designated "AGraph") for comparison (step 743). If the selected AGraph is the marked location, the list has been traversed and no further processing is necessary, so the 'Y' branch is taken from step 744). If the end of the list is not reached, the successor of AGraph is selects as BGraph (step 745). Because AGraph and BGraph are peers for purposes of comparison, it is not necessary to compare any graphs preceding AGraph on the list, as these will already have been compared.

If the root of AGraph matches the root of BGraph, the 'Y' branch is taken from step 746. In this case BGraph is joined to AGraph at the root node, and the root node annotations of AGraph are incremented by the corresponding quantities from the root node annotations of BGraph (step 747). The analyzer then merges any descendant nodes of BGraph's root which match corresponding descendant nodes of AGraph' root, and updates the annotations accordingly (step 748). Step 748, while shown as a single step, typically requires a recursive procedure to traverse the nodes of the graphs until a match can no longer be found, at which point any unmatched nodes from BGraph are appended as new branches of AGraph.

If the selected BGraph was not at the end of the list of call graphs, the 'N' branch is taken from step 749, and a next BGraph is selected (step 750) for comparison with AGraph at step 746. When the end of the list has been reached, the 'Y' branch is taken from step 749 to step 742

When the final pass has been completed as described above, the analyzer saves the call graph data it has generated in an appropriate form (step 751). The call graphs are preferably sorted according to some measure of importance. In the preferred embodiment, the call graphs are sorted by maximum stack count of any included node, i.e., the stack count of the node within the call graph which has the highest stack count of any node within that call graph.

The call graph data thus constructed can be used for various purposes, and in particular is preferably presented to a programmer in graphical display form on an interactive display screen, represented generally as step 507. FIGS. 8A and 8B are simplified representations of an interactive display showing call graph data including the call graph of FIG. 4. FIG. 8A shows a list of call graphs generated by analyzer 222 from sampled data, the call graphs being listed in unexpanded form, showing only the root nodes of each respective call graph. As shown in FIG. 8A, five call graphs have been constructed from the data. With respect to each call graph (or sub-graph), a maximum count, a stack count, and an execution count is displayed at the right, these values being taken from the annotations constructed as described above with respect to FIG. 7. The maximum count represents the highest stack count of any included node, and, as shown in FIG. 8A, the call graphs are sorted according to maximum count. The shaded horizontal bars associated with each number represent the number graphically as a percentage of the largest max count A programmer can obtain more detailed information with respect to any particular call graph by interactively expanding the call graph to an arbitrary level of nodes. When any single node is expanded, all children of that node at the immediately succeeding level of the call graph hierarchy are displayed, the children being indented from the parent to graphically represent the hierarchy. The child nodes can be further expanded by selecting each child in turn. FIG. 8B shows the same list of call graphs, with the call graph of FIG. 4 partially expanded to show certain nodes and branches. The "−" and "+" symbols in front of each procedure name indicate whether or not the node is in expanded form; the absence of such a symbol indicates a leaf node.

Additional graphical elements can be used to convey additional information. For example, if a "true root" is identified, the call graph having the true root may be displayed in some visually distinctive manner, such as by a highlighted font or by attaching some symbol to indicate a true root node.

Presentation of call graph data on an interactive display for analysis by a programmer is just one use to which call graph data can be put. Such data might alternatively be presented in other ways, such as by printing reports, or may be stored in electronic form for inclusion in or manipulation by other data processing programs, and in particular might be used as input to an optimizing compiler which uses data gathered from execution of a program to automatically determine an optimized form of executable code for a computer program.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Examples of signal-bearing media are illustrated in FIG. 1 as system memory 102, and as data storage devices 125-127.

In the preferred embodiment, each sampled data set is limited to the same fixed number of stack entries, such as the 16 most recent entries. However, it would alternatively be possible to collect the entire call history sequence with each sample (i.e., the procedures from all of the stack entries, regardless of the number of entries on the stack). This alternative obviously has the potential to drastically increase the amount of data collected. In the case of some older programming languages which tend to have fewer calls and shorter call sequences, this additional overhead burden may be small. As a further alternative, it would be possible to vary the number of stack entries in order to obtain more complete call history data. For example, every Kth sample could contain a larger number of entries, and might even contain all the procedures on the stack. If K is sufficiently large (e.g., 100), then the collection of additional data at every Kth interval would impose only a small additional overhead, yet occasional full or expanded snapshots of the call stack might help to provide a more complete picture of call history. In this case, the basic process for merging sampled data would be unchanged, but call graphs would preferably be constructed using the expanded samples first.

Although a specific embodiment of the invention has been disclosed along with certain alternatives, it will be recognized by those skilled in the art that additional variations in form and detail may be made within the scope of the following claims:

What is claimed is:

1. A computer-executed method for analyzing call history of a computer program, comprising the steps of:
   automatically collecting and storing a plurality of call history data sets at respective pre-defined sampling intervals during execution of said computer program, each call history data set comprising data identifying a respective called procedure of said computer program associated with each of a plurality of stack entries from a call stack, wherein each said call history data set is limited to a fixed number of said called procedures associated with the most recent stack entries from said call stack, said fixed number being fewer than the number of stack entries on said call stack for at least some of said pre-defined sampling intervals;
   subsequent to execution of said computer program, automatically constructing a call graph using said call history data sets stored during execution of said computer program, said call graph being constructed by selectively merging a plurality of call history sequences from respective said call history data sets according to whether the call history sequences meet at least one pre-determined merge criterion, wherein said at least one pre-determined merge criterion comprises whether a first contiguous subset of a first call history sequence constructed from at least one respective call history data set matches a second contiguous subset of a second call history sequence constructed from at least one respective call history data set, each of said first and second subsets having a pre-determined minimum size greater than one.

2. The method for analyzing call history of claim 1, further comprising the step of presenting a representation of said call graph to a user.

3. The method for analyzing call history of claim 1, further comprising the step of:
   automatically identifying a root node of a first call history sequence from a call history data set having called procedure data from fewer than said fixed number of stack entries as a true root node;
   wherein said step of automatically constructing a call graph using said call history data sets comprises preventing the merger of said first call history sequence into a call graph if said true root node would thereby become a child node of a node in the call graph.

4. The method for analyzing call history of claim 1, wherein said at least one pre-determined merge criterion comprises whether a root node of a first call history sequence constructed from at least one respective call history data set matches a root node of a second call history sequence constructed from at least one respective call history data set.

5. The method for analyzing call history of claim 1, wherein said step of automatically constructing a call graph comprises (a) constructing a call graph of an initial size from a first call history sequence from a call history data set, (b) comparing said call graph with each of a plurality of call history sequences from respective call history data sets to determine whether said at least one pre-determined merge criterion is met (c) expanding said call graph to an expanded size by merging a second call history sequence from a second call history data set into said call graph, and (d) iteratively repeating steps (b) and (c) to continue expanding said call graph until no more of said call history sequences from respective call history data sets can be merged into said call graph.

6. The method for analyzing call history of claim 1, wherein said call graph generation function (i) constructs a call graph of an initial size from a first call history sequence from a call history data set, (ii) compares said call graph with each of a plurality of call history sequences from respective call history data sets to determine whether said at least one pre-determined merge criterion is met (iii) expands said call graph to an expanded size by merging a second call history sequence from a second call history data set into said call graph, and (iv) iteratively repeating steps (i) and (ii) to continue expanding said call graph until no more of said call history sequences from respective call history data sets can be merged into said call graph.

* * * * *